United States Patent [19]
Stadnick et al.

[11] Patent Number: 6,013,388
[45] Date of Patent: Jan. 11, 2000

[54] BATTERY CELL TERMINAL

[75] Inventors: Steven J. Stadnick, Lakewood; Allen R. Powers, Torrance; Barry G. Gage, La Crescenta, all of Calif.

[73] Assignee: Hughes Electronics Corporation, Los Angeles, Calif.

[21] Appl. No.: 09/098,850

[22] Filed: Jun. 17, 1998

[51] Int. Cl.$^7$ ............................ H01M 10/50; H01M 2/30
[52] U.S. Cl. ................................. 429/120; 429/178
[58] Field of Search ........................... 429/120, 178, 429/179, 65

[56] References Cited

U.S. PATENT DOCUMENTS

| | | | |
|---|---|---|---|
| 3,711,335 | 1/1973 | Daniel . | |
| 4,292,381 | 9/1981 | Klein | 429/120 |
| 4,324,845 | 4/1982 | Stockel | 429/101 |
| 4,396,692 | 8/1983 | Eberle | 429/179 |
| 5,925,228 | 7/1999 | Panitz et al. | 204/484 |

*Primary Examiner*—Maria Nuzzolillo
*Assistant Examiner*—Jonathan Crepeau
*Attorney, Agent, or Firm*—Terje Gudmestad; Georgann Grunebach; Michael W. Sales

[57] ABSTRACT

A battery cell terminal having structure for receiving a thermal conductor. The receiving structure may comprise a bore defined by an inner surface of the terminal. The thermal conductor may be a heat pipe or other suitable conductor. A layer of electrical insulation may be disposed between the terminal and the thermal conductor. The terminal conducts heat produced by electrodes in the cell to the thermal conductor which then conducts the heat to a heat sink.

16 Claims, 3 Drawing Sheets

FIG. 2
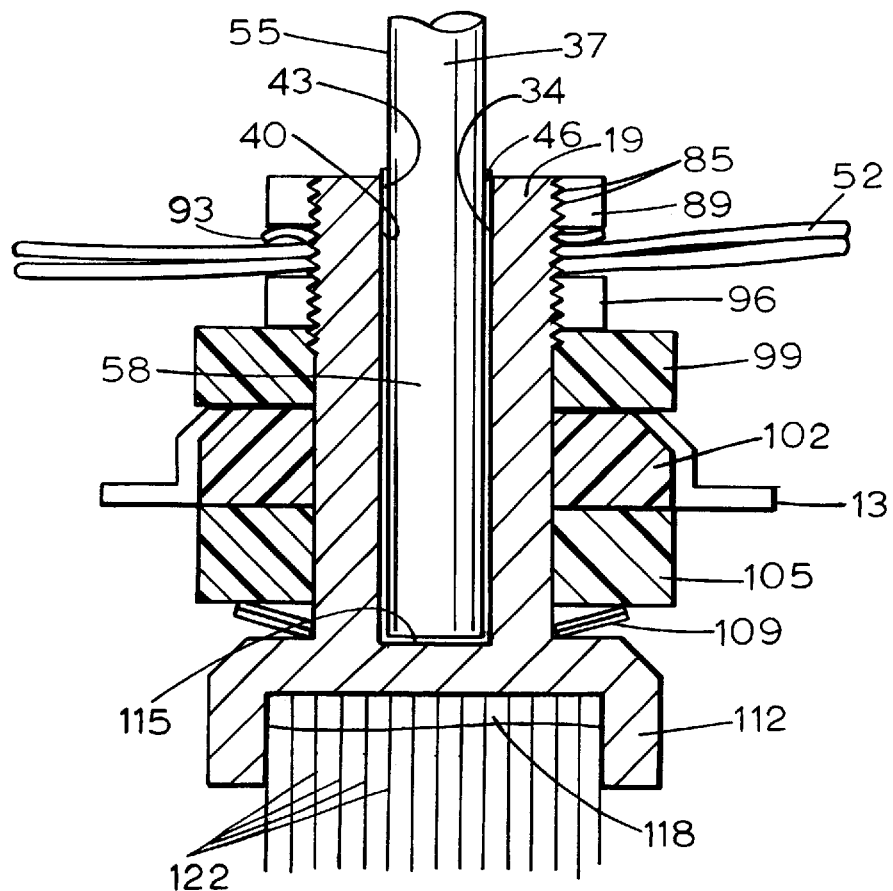
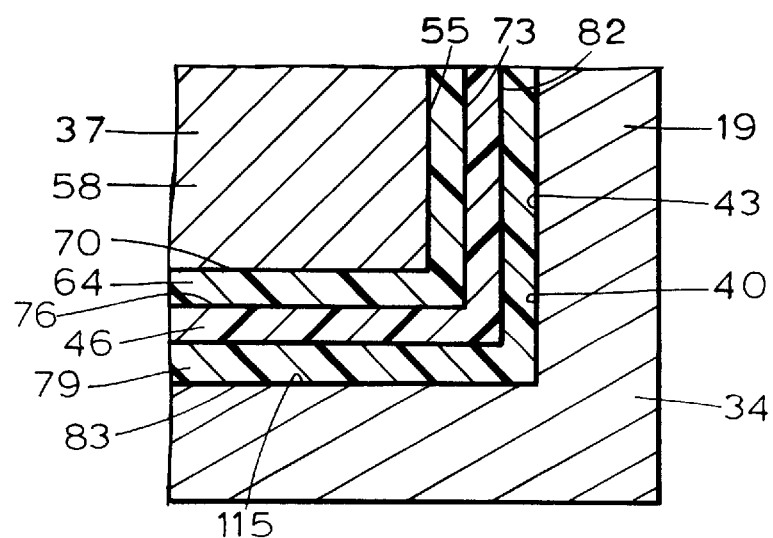
FIG. 3

BATTERY CELL TERMINAL

BACKGROUND OF THE INVENTION

1. Field of the Invention

This invention relates to a heat transfer system for controlling the temperature of a battery. More specifically, this invention relates to apparatus and methods useful in dissipating heat generated by operation of a battery used in a spacecraft or an electrical vehicle through a terminal of the battery.

2. Brief Description of the Related Art

A typical battery comprises a plurality of cells in a stack. Each cell has one or more electrodes and a pair of terminals. Interconnectors connect one cell terminal to another cell terminal. An outer casing is disposed around the cells. The outer casing is typically electrically insulated from the terminals. An electrically insulating layer is located between the inner surface of the outer casing and the cells.

Waste heat generated in the electrodes of the battery cell must be conducted away from the cell to keep a battery at a temperature suitable for operation. Spacecraft batteries typically accomplish this by conducting heat on a thermal conduction path from the electrodes to the outer casing of the battery and then through a thermal conduction path (e.g., a heat pipe) to a heat sink (e.g., a radiator). The thermal conduction path from the cell stack to the outer casing of the battery has a high internal thermal resistance because between the edge of the cell stack and the outer casing there is a gap or insulator for electrical insulation which has a high thermal resistance compared to metal-to-metal contact.

Dissipation of generated heat via the aforementioned route is convenient because each of the cell terminals, electrodes, and cell interconnectors are necessary electrical components of a battery regardless of how little heat must be dissipated. Conventional battery cells for high current applications, such as spacecraft or electric vehicles, have heavy electrical conductors, called interconnectors, connecting one cell to another. In addition, each cell has a heavy thermal conductor connecting the cell case to the radiator. Typically, the only element necessary for the sole purpose of controlling the temperature of the battery is the aforementioned conductor which, when used in a spacecraft, weighs about sixty pounds.

Conductive heat transfer via the aforementioned route is suitable in situations where the weight of the battery is not a concern. However, where the weight of the battery is a concern, the typical heat conduction paths impose restrictions on the use of the battery in certain applications. Such a weight restriction exists when a battery is used in a spacecraft where each unit of weight corresponds to an incremental unit of cost. For example, the cost to transport one pound of hardware into space is about $20,000 (1997 dollars). Thus, the benefits of any weight reduction would immediately result in a substantial cost savings.

In some conventional battery cells, heat produced in the electrodes must pass through an insulating gas to reach the outer casing of the cell. The heat must then cross the cell outer casing, which is typically a poor thermal conductor, and pass through a layer of insulation outside of the outer casing prior to reaching the thermal conductor. Thus, there is a need for battery cells with shorter, more efficient thermal conduction paths.

Changes in cell pressure, which may occur in space applications, cause the outer casing to move which may cause debonding of the outer case from the thermal conductor. The debonding greatly reduces the thermal contact, thereby decreasing the efficiency of heat transfer from the outer casing to the thermal conductor.

It would be desirable to provide an apparatus that can remove heat generated in a battery cell, wherein the apparatus remains generally unaffected by variations in cell pressure. Furthermore, it would be desirable to eliminate the necessity of a heavy thermal conductor external to the battery cell, yet provide a suitable means for controlling and dissipating the heat generated within the battery cell. Still further, it would be desirable to provide a weight-conservative apparatus and methods for controlling and dissipating the heat generated by operation of a battery cell.

SUMMARY OF THE INVENTION

It is an object of the invention to overcome one or more of the problems described above. The invention reduces the difficulties and disadvantages of the prior art by providing weight-conservative, relatively simple, yet highly efficient apparatus and methods for controlling the operating temperature of the battery. The weight reduction, in turn, provides significant savings over conventional apparatus and methods used to control the battery temperature in spacecraft and electrical vehicles.

One embodiment of the apparatus of the present invention is a battery terminal having an outer surface and an inner surface, the inner surface defining a bore for receiving a thermal conductor. The bore may be substantially cylindrical.

Another aspect of the present invention is a heat transport apparatus for a battery cell. The heat transport apparatus comprises a battery cell terminal having an outer surface and an inner surface, the inner surface defining a bore. The apparatus also comprises a thermal conductor (e.g., a heat pipe having an anodized outer surface) at least partially disposed in the bore.

The heat transport apparatus may comprise an electrically insulating sleeve disposed between at least part of an outer surface of the thermal conductor and the inner surface of the terminal. Additionally or alternatively, the heat transport apparatus may include a layer of thermally conductive adhesive disposed between at least a part of the thermal conductor and the inner surface of the terminal.

A further aspect of the present invention is a method for transporting heat from a battery cell. The method comprises the steps of providing a battery cell terminal having an outer surface and an inner surface that defines a bore, and inserting an end portion of a thermal conductor into the bore. The method may also comprise the step of depositing a layer of electrically insulating, thermally conductive material onto an end portion of the thermal conductor prior to the step of inserting the end portion of the thermal conductor into the bore. The method may comprise the step of depositing a layer of thermally conductive adhesive on at least a portion of the electrically insulating, thermally conductive layer.

Other aspects and advantages of the invention will become apparent to those skilled in the art from a review of the following detailed description, taken in conjunction with the drawings and the appended claims.

BRIEF DESCRIPTION OF THE DRAWINGS

FIG. 2 is a fragmentary, sectional view of a battery cell terminal in accordance with the present invention;

FIG. 3 is an enlarged, partial, cross-sectional view of a layered insulating sleeve for use in connection with the inventive apparatus.

DETAILED DESCRIPTION OF THE INVENTION

Figure 1:
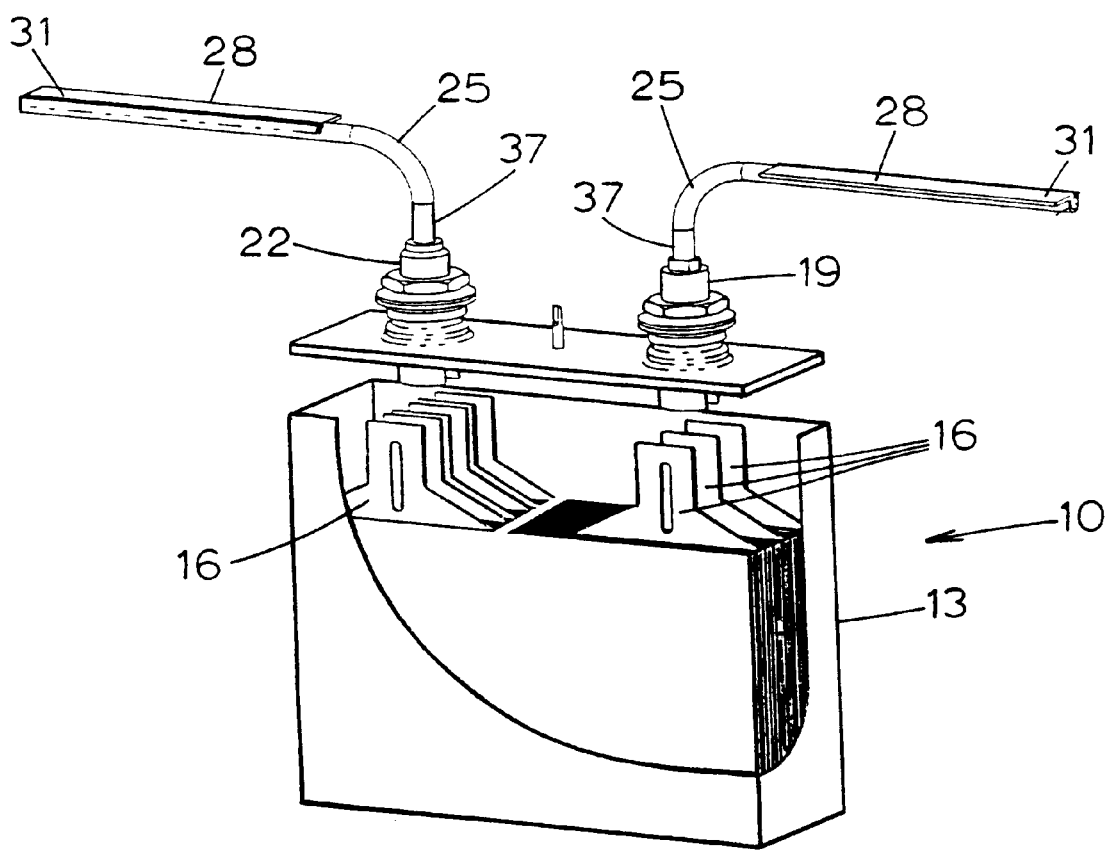
FIG. 1 is a partial, exploded view of a battery cell and heat control apparatus according to the invention.

A battery cell 10 is shown in FIG. 1 and comprises an outer casing 13 which envelops a plurality of electrodes 16. Each electrode 16 is in contact with one of either a positive cell terminal 19 or a negative cell terminal 22. Each terminal 19, 22 is shown in thermal contact with a heat pipe 25. The heat pipe 25 has a heat sink 28 in the form of a radiator fin 31.

Only the terminal 19 will be discussed in detail below, however the same features apply for the terminal 22. The terminal 19 has structure 34 for receiving at least a portion of a thermal conductor 37 such as the heat pipe 25 or an aluminum rod (not shown). As best seen in FIG. 2, the structure 34 may be a bore 40 defined by an inner surface 43 of the terminal 19. An electrically insulating layer 46, described in more detail below, is disposed between the thermal conductor 37 and the terminal 19. Although the bore 40 is shown as a cylinder, the bore 40 may be any shape suitable for receiving the thermal conductor 37.

The thermal conductor 37, which is electrically insulated from the terminal 19, extends from the bore 40 to a radiator 49 (FIG. 4) or other heat sink. A passive conductor, such as an aluminum rod, may be suitable as the thermal conductor 37 for conducting heat from the cell 10 to the radiator 49, so long as the radiator 49 is relatively close to the cell 10. In other circumstances, the heat pipe 25 may be preferable as the thermal conductor 37.

Suitable battery cells for having the terminal 19 in accordance with the present invention include lithium ion battery cells, nickel metal hydride battery cells, and nickel cadmium battery cells.

The terminal 19 conducts electricity from the electrodes 16 in the cell 10 to an electrical application such as an adjacent cell or an electrical device. The terminal 19 may be composed of high purity, high conductivity nickel. An electrical conductor 52 (e.g., interconnect or lead as seen in FIG. 2), which is electrically connected to the terminal 19, conducts electricity to the next cell 10 in embodiments in which the cells 10 are electrically connected to one another, or to power conversion electronics.

Because each cell has two terminals: the positive terminal 19 and the negative terminal 22, each cell 10 can accommodate two thermal conductors 37, one thermal conductor 37 for the positive terminal 19 and one for the negative terminal 22. This results in redundancy and in fault tolerance. Only one thermal conductor 37 is shown in FIG. 2, because only the terminal 19 is shown in FIG. 2.

As noted above, the thermal conductor 37 should be electrically insulated from the cell terminal 19 of the battery cell 10. To accomplish this, the thermal conductor 37 may be electrically insulated with an insulating layer 46 disposed or deposited on an outer surface 55 of the thermal conductor 37. The layer 46 need only cover a portion of the conductor 37, namely an end portion 58 that, in the absence of the electrically insulating layer 46, would contact the terminal 19. Due to the suitable thermal conductivity characteristics of the electrical insulation, the thermal conductor 37 effectively remains in thermal contact with the terminal 19. The insulating layer 46 may comprise, for example, LP509®, sprayed-on Mylar® (polyester), T-PLI®, polysulfone or any high thermal conductivity electrical insulator. The polysulfone may be sprayed onto the thermal conductor 37 or the thermal conductor 37 may be dipped in polysulfone.

There should be few or no gaps (1) between the thermal conductor 37 and the insulating layer 46 or (2) between the insulating layer 46 and the terminal 19. The reason for reducing gaps or eliminating gaps altogether is that gaps reduce thermal conduction significantly. This is particularly true in space applications where the gaps are a vacuum.

To avoid having gaps, adhesive may be placed on both sides of the electrically insulating layer 46. Suitable heat conductive adhesives include thermally conductive epoxies, thermally conductive iron oxide or barium oxide, room-temperature-vulcanizing (RTV) rubbers, silicone rubbers, T-PLI®, and others.

Alternatively, if the layer 46 is sprayed onto the thermal conductor 37 or the layer 46 is an anodized layer (discussed below but not shown), then adhesive need only be placed on one side of the layer 46 (i.e., the side that will be proximal to the inner surface 43 of the terminal 19 when the conductor 37 is in the bore 40). This is so because there are few or no gaps between the conductor 37 and such an anodized layer or such a sprayed-on layer.

The electrically insulating layer 46 electrically insulates the thermal conductor 37 from the terminal 19. If the thermal conductor 37 is the heat pipe 25 or an aluminum rod, the thermal conductor 37 typically has an aluminum exterior having a layer of alumina, which is an anodized layer of oxides known to have excellent corrosion resistance, suitable thermal conductivity characteristics, and suitable electrical insulation properties. The alumina layer is electrically insulating and thermally conducting.

Alternatively, the electrically insulating layer 46 on the outer surface of the heat pipe 25 may be a thermally conducting adhesive such as thermally conductive epoxies, thermally conductive iron oxide or barium oxide, room-temperature-vulcanizing (RTV) rubbers, and silicone rubbers. The insulating layer 46 on the heat pipe 25 may also comprise, for example, LP509®, sprayed-on Mylar®, or polysulfone. The polysulfone may be sprayed onto the heat pipe 25 or the heat pipe 25 may be dipped in polysulfone.

Shown in FIG. 3 is an arrangement of the electrically insulating layer 46 and adhesive layers suitable for conductors that do not have a sprayed-on or anodic layer 46. The arrangement comprises a first layer 64 of thermally conductive adhesive material disposed on an outer surface 55 of the conductor 37. An inner surface 70 of the first adhesive layer 64 contacts the outer surface 55 of the conductor 37, while an outer surface 73 of the first adhesive layer 64 is in contact with an inner surface 76 of the electrical insulation layer 46. A second layer 79 of thermally conductive adhesive material is disposed about an outer surface 82 of the electrical insulation layer 46. An outer surface 83 of the second thermally conductive adhesive layer 79 is in thermal contact with the terminal 19.

A heat pipe for use according to embodiments having the heat pipe 25 as the thermal conductor 37 is a vacuum-tight vessel that is evacuated and partially filled with a volatile heat transfer fluid. The heat pipe 25 is characterized by an extremely high thermal conductance attributable, in part, to a process of vapor state heat transfer. A more detailed disclosure regarding heat pipes suitable for the present invention is provided in co-filed, co-pending, and commonly owned U.S. patent application Ser. No. 09/098,849 to Steven J. Stadnick and Stanley J. Krause, entitled "Method and Apparatus for Transferring Heat Generated by a Battery," which is incorporated herein by reference. For a general description of the fluid flow phenomena occurring within a heat pipe, see KIRK OTHMER's ENCYCLOPEDIA OF CHEMICAL TECHNOLOGY, vol. 12, pgs. 1011–1021 (John Wiley & Sons, Inc., New York, 1996).

An exemplary heat sink for use in space technology comprises an aluminum fin (not shown) which radiates heat into space, the fin being cooled by the space environment.

Referring again to FIG. 2, the terminal 19 may have threads 85 and a conductive nut 89 may be placed around the threads 85. The conductive nut 89 may be composed of silver-plated brass. Below the conductive nut 89 may be a spring washer 93, which may be composed of beryllium copper, and electrical leads 52, typically composed of copper or aluminum. A conductive nut 96 may be placed below the electrical leads 52, and an insulating washer 99 is placed below the conductive nut 96. The conductive nut 96 may be composed of silver-plated brass and the insulating washer 99 may be composed of Teflon® (PTFE).

The cell case 13 extends below the insulating washer 99 and may be composed of stainless steel. Between the cell case 13 and the terminal 19 is seal material 102 such as polyethylene, polypropylene, or Teflon®. Below the seal material 102 is an electrically insulating washer 105 which may be composed of polysulfone. Below the insulating washer 105 are Belleville washers 109 which seal the terminal 19 and provide a substantially constant load when compressed. The Belleville washers 109, which may be composed of Inconel 718, may instead be placed outside of the cell 10.

A slot 112 of the terminal 19 is located below the Belleville washers 109. The thickness of the base of the slot 112 is about 1/8 inch (3.2 mm) between an end 115 of the terminal bore 40 and a weld 118 (shown schematically) that connects electrode leads 122 to the terminal 19. The electrode leads 122 provide electricity to the terminal 19.

If the thermal conductor 37 is the heat pipe 25 and the heat pipe 25 might become damaged by the heat produced during welding of the electrodes 16 in the cell 10, the heat pipe 25 may be slipped into the bore 40 after assembly of the battery cell 10. As previously noted, adhesive should be used between the heat pipe 25 and the inner surface 43 of the terminal 19 during assembly to minimize or avoid gaps.

Figure 4:
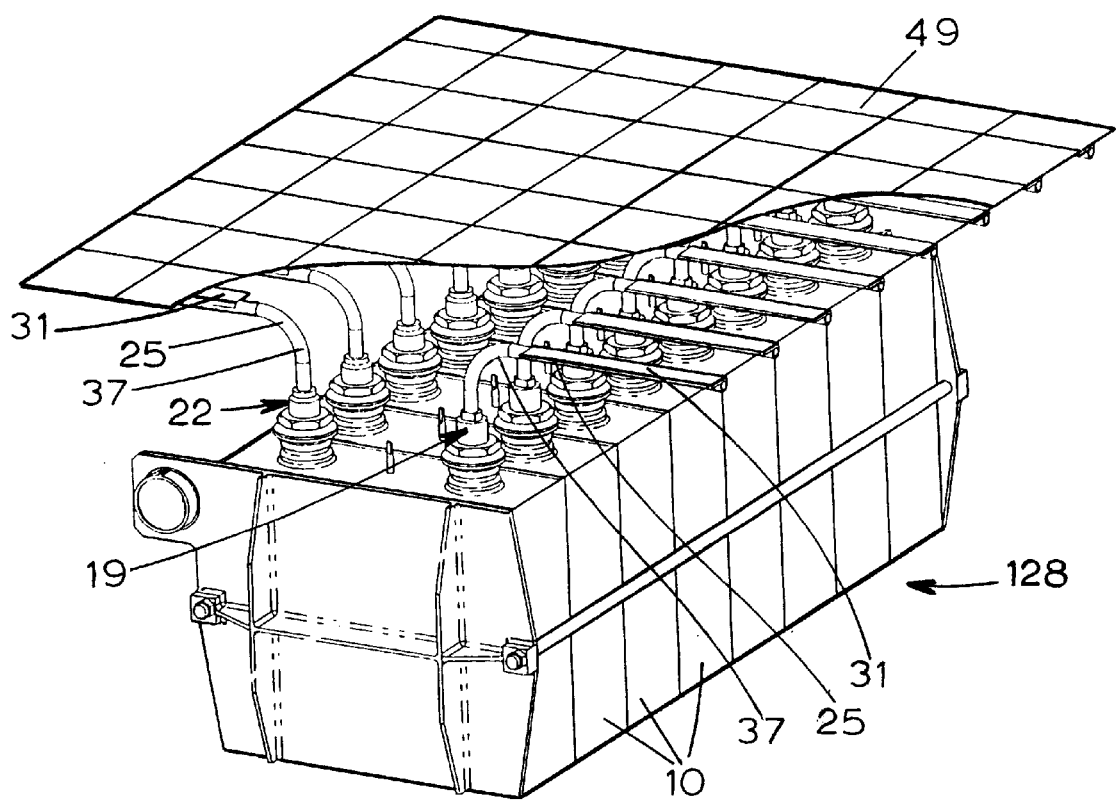
FIG. 4 is a perspective of a battery comprising battery cells similar to the cell shown in FIG. 1.

FIG. 4 illustrates a battery 128 comprising a plurality of the cells 10 each of which has the positive terminal 19 and the negative terminal 22 receiving an end portion of the heat pipe 25. As shown in FIG. 4, each heat pipe 25 is in thermal contact with a heat sink, shown in the form of the radiator plate 49.

In operation, the thermal path from the battery cell 10 is through the thermal conductor 37. Thus, the battery cells 10 are compact and result in significant weight savings for the battery 128. By using the heat path to the terminals 19, 22 (i.e., the path from the electrode leads 122 (FIG. 2) to the terminals) as the primary thermal transfer path, the weight of the battery 128 is greatly reduced, the weight reduction resulting, in part, from the elimination of external thermal conductors.

The thermal path and the electrical path of the terminal 19 are concentric in the embodiment of FIGS. 1 and 2. Although depicted as a cylinder, the bore 40 may be any shape suitable for accommodating the thermal conductor 37. Although the bore 40 is shown to be coaxial with the portion of the terminal 19 defining the bore 40, the bore 40 need not be positioned in that fashion. In embodiments in which the bore 40 is not coaxial with the terminal 19, as well as embodiments in which the bore 40 is coaxial with the terminal 19, the thermal conduction path through the terminal 19 runs generally in the same direction as the electrical conduction path through the terminal 19.

The cell case 13 has a positive seal which has the capability of being loosened to provide for gas venting, electrolyte adjustment, or resetting of precharge. Sealing of cells is described in greater detail in U.S. Pat. No. 4,224,388 to Stadnick, which is incorporated herein by reference. Loosening of the terminal seal is accomplished by removing the nut 89.

A method in accordance with the present invention comprises the steps of (a) providing the battery cell terminal 19 having an outer surface and having the inner surface 43 that defines the bore 40, and (b) inserting the end portion 58 of the thermal conductor 37 into the bore 40. The thermal conductor 37 may be the heat pipe 25.

The method may comprise the step of depositing the layer 46 of electrically insulating, thermally conductive material onto the end portion 58 of the thermal conductor 37 prior to the step of inserting the end portion 58 of the thermal conductor 37 into the bore 40. The electrically insulating, thermally conductive layer 46 may comprise LP509®, Mylar®, or polysulfone.

The method may comprise the step of depositing a layer of thermally conductive adhesive on at least a portion of the electrically insulating, thermally conductive layer 46. The layer of thermally conductive adhesive may comprise thermally conductive epoxies, thermally conductive iron oxide, thermally conductive barium oxide, room-temperature-vulcanizing rubbers, silicone rubbers, or T-PLI®.

The present invention thus allows heat to be conducted away from the cell 10 while maintaining a seal and providing proper electrical paths. For example, a 10% savings in battery weight might be accomplished, which would be about 60 pounds for an 8 kilowatt spacecraft.

The foregoing description is given for clearness of understanding only, and no unnecessary limitations should be understood therefrom, as modifications within the scope of the invention will be apparent to those skilled in the art.

What is claimed is:

1. A heat transport apparatus for a battery cell, the apparatus comprising:

a battery cell terminal having an outer surface and having an inner surface defining a bore;

a thermal conductor at least partially disposed in the bore; and an electrically insulating layer disposed between at least part of the outer surface of the thermal conductor and the inner surface of the terminal.

2. The heat transport apparatus of claim 1 wherein:

the electrically insulating material is adhered to the thermal conductor and to the terminal inner surface.

3. The heat transport apparatus of claim 1 wherein the battery cell is selected from the group consisting of lithium ion battery cells, nickel metal hydride battery cells, and nickel cadmium battery cells.

4. The heat transport apparatus of claim 1 wherein the bore is substantially cylindrical.

5. The heat transport apparatus of claim 1 wherein the thermal conductor comprises a heat pipe.

6. The heat transport apparatus of claim 5 wherein the heat pipe has an anodized outer surface.

7. The heat transport apparatus of claim 6 and comprising a layer of thermally conductive adhesive on the anodized outer surface.

8. A heat transport apparatus for a battery cell, the apparatus comprising:
   a battery cell terminal having an outer surface and having an inner surface defining a bore;
   a thermal conductor at least partially disposed in the bore; and
   a layer of thermally conductive adhesive disposed between at least a part of the thermal conductor and the inner surface of the terminal.

9. The heat transport apparatus of claim 8 wherein the layer of thermally conductive adhesive is selected from the group consisting of thermally conductive epoxies, thermally conductive iron oxide, thermally conductive barium oxide, room-temperature-vulcanizing rubbers, and silicone rubbers.

10. The heat transport apparatus of claim 8 and comprising an electrically insulating sleeve disposed between at least part of an outer surface of the thermal conductor and the thermally conductive adhesive.

11. The heat transport apparatus of claim 10 wherein the electrically insulating sleeve is composed of polysulfone.

12. A method for transporting heat from a battery cell, the method comprising the steps of:
   providing a battery cell terminal having an outer surface and having an inner surface defining a bore;
   providing a thermal conductor;
   depositing a layer of electrically insulating, thermally conductive material onto an end portion of the thermal conductor; and thereafter
   inserting the end portion of the thermal conductor into the bore.

13. The method of claim 12 wherein the electrically insulating, thermally conductive layer comprises polysulfone.

14. The method of claim 12 and comprising the step of:
   depositing a layer of thermally conductive adhesive on at least a portion of the electrically insulating, thermally conductive layer.

15. The method of claim 14 wherein the layer of thermally conductive adhesive is selected from the group consisting of thermally conductive epoxies, thermally conductive iron oxide, thermally conductive barium oxide, room-temperature-vulcanizing rubbers, and silicone rubbers.

16. The method of claim 12 wherein the thermal conductor is a heat pipe.

* * * * *